J. L. H. FAARBORG.
POTATO DIGGING MACHINE.
APPLICATION FILED DEC. 31, 1915.
1,255,302.
Patented Feb. 5, 1918.
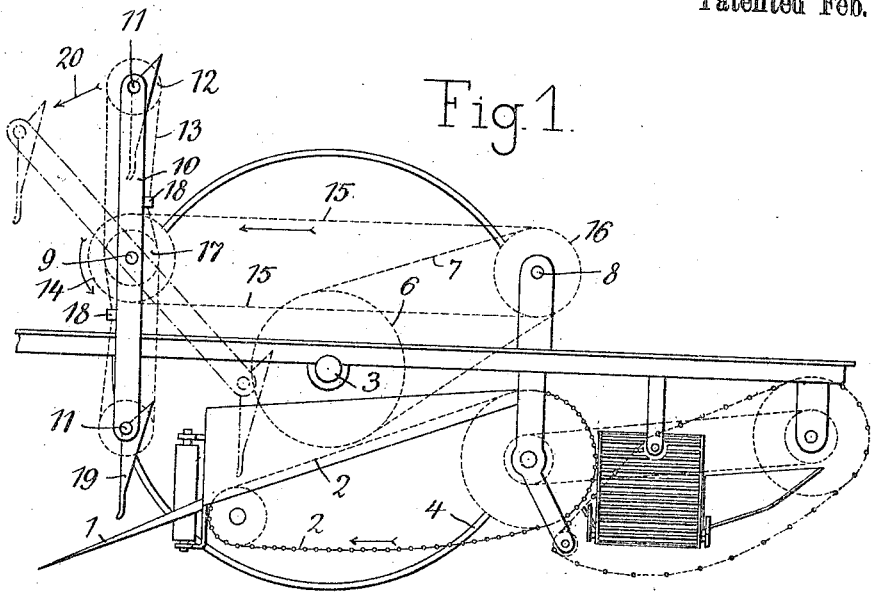
Fig. 1.
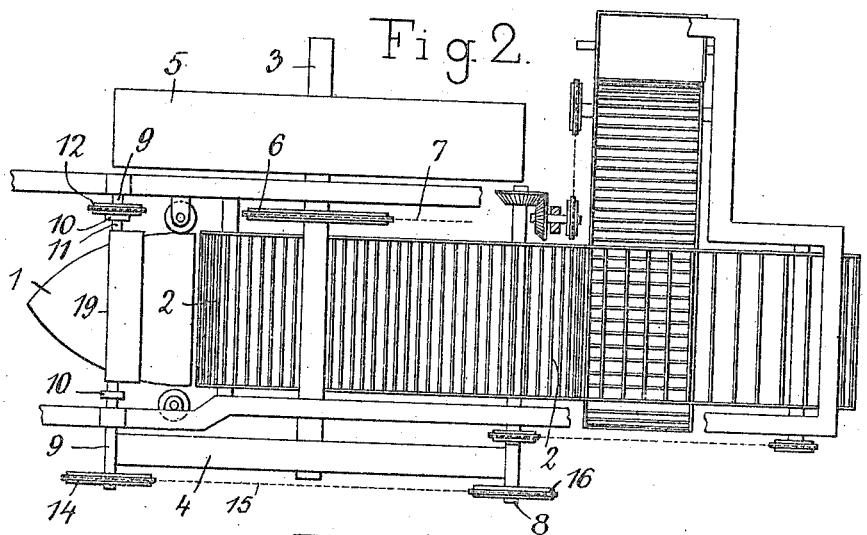
Fig. 2.
Fig. 3. Fig. 4.
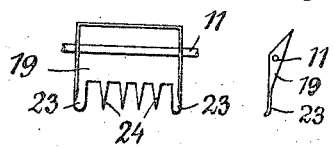
Inventor
Jens Laurits Henriksen Faarborg
Attorney.

UNITED STATES PATENT OFFICE.

JENS LAURITS HENRIKSEN FAARBORG, OF TRANEBJERG, SAMSÖ, DENMARK, ASSIGNOR TO THE FIRM OF N. C. BREIT & CO., OF COPENHAGEN, DENMARK.

POTATO-DIGGING MACHINE.

1,255,302.  Specification of Letters Patent.  Patented Feb. 5, 1918.

Application filed December 31, 1915.  Serial No. 69,521.

*To all whom it may concern:*

Be it known that I, JENS LAURITS HENRIKSEN FAARBORG, farmer, a subject of the King of Denmark, residing at Tranebjerg, Samsö, in the Kingdom of Denmark, have invented new and useful Improvements in Potato-Digging Machines, of which the following is a specification.

My present invention refers to a potato digging machine with a digging iron and, behind this, a grating-shaped elevator, on which the dug potatoes, potato tops, and earth are carried forward, the potatoes and tops falling down at the upper end of the elevator, while the earth falls down through the grating.

The characteristic feature of the invention is, that, above the digging iron, there are disposed scraping implements such as movable shovels, forks, or the like, which, during the forward motion of the machine, are passed over the digging iron toward the elevator, and which, during their movement, constantly assume the same position in relation to the vertical plane through their horizontal supporting axles.

The scraping implements serve to scrape the potatoes, tops, and earth off the digging iron and carry them over on to the elevator.

My invention is set forth in the drawing, in which—

Figure 1 is a side view of the potato digging machine;

Fig. 2 is a top view of the same;

Figs. 3 and 4 are details.

1 is the digging iron, and 2 is the elevator situated behind it. 3 is the driving axle, and 4 and 5 are the driving wheels, wheel 5 having a felloe, or rim, considerably wider than that of wheel 4. 6 is a sprocket wheel in fast connection with wheel 5, and as the machine is driven forward this sprocket wheel, by means of a chain 7, transmits the motion of wheel 5 to a shaft 8, from which the different members of the machine are driven.

9 is a shaft disposed in bearings and running transversely in the machine frame, said shaft carrying rods 10 in whose ends there are bearings for shafts 11 which bear sprocket wheels 12 for a chain 13. 14 is a sprocket wheel fixed on the shaft 9, said sprocket wheel being turned by means of a chain 15 passing over a sprocket wheel 16 on the shaft 8. 17 is a sprocket wheel fixed on one bearing of the shaft 9, the chain 13 being pressed in toward said sprocket wheel by means of straps 18 on the rod 10. 19 are scraping implements such as shovels, forks, or the like (see Figs. 3 and 4), which are fast disposed on the shafts 11, and which may either hang vertically down from the latter or somewhat obliquely, so that they stand approximately at right angles to the digging iron 1.

As the machine is being driven along, the rods 10, together with the shaft 9, are turned in the direction indicated by the arrow. During the revolution of the shaft, the chain 13, which is held fast by the fast disposed sprocket wheel 17, causes the sprocket wheel 12, and thereby the shafts 11, to revolve in such a manner that the scraping implements 19 constantly maintain one and the same position in relation to the vertical plane through the shafts 11 (see Fig. 1). The implements 19 may either have the shape of ordinary shovels, so that the lower edge is rectilinear, or they may have two branches 23, with intermediate tines 24, as shown in Fig. 3, or they may have any other suitable shape. During the forward movement of the machine, the implements 19 are moved over the digging iron 1, carrying earth, potatoes, and tops over on to the elevator, so that the digging and carrying forward of the dug-up potatoes cannot be impeded by the tops collecting on the digging iron. Since the scraping implements associated with the digging iron alone are covered by the appended claim, the particular conveyer construction and cleaning and discharging means employed will not be described specifically herein.

Having now particularly described and ascertained the nature of my said invention and in what manner the same is to be performed, I declare that what I claim is:—

In a potato-digging machine, the combination with a digging-iron and an elevator disposed behind the same, of a rotatable shaft, arms fixed on the shaft, other shafts journaled in the said arms, scraping implements fixedly mounted on the last-named shafts and adapted to move across the digging-iron during rotation of the first-named shaft, a stationary sprocket wheel disposed concentric to the first-named shaft, a sprocket wheel fixed on each of the second-named shafts, a chain passing around all of the said sprocket wheels, and means for rotating the first-named shaft.

In testimony whereof I have signed my name to this specification in the presence of two subscribing witnesses.

JENS LAURITS HENRIKSEN FAARBORG.

Witnesses:
V. BELSCHUER,
JOHN CLAUS.

Copies of this patent may be obtained for five cents each, by addressing the "Commissioner of Patents, Washington, D. C."